United States Patent [19]

Alyfuku

[11] Patent Number: 4,676,625
[45] Date of Patent: Jun. 30, 1987

[54] STROBE RE-ACTUATING DEVICE

[75] Inventor: Kiyoshi Alyfuku, Kanagawa, Japan

[73] Assignee: Canon Kabushiki Kaisha, Tokyo, Japan

[21] Appl. No.: 686,707

[22] Filed: Dec. 27, 1984

[30] Foreign Application Priority Data

Dec. 27, 1983 [JP] Japan ................................. 58-245963
Dec. 28, 1983 [JP] Japan ................................. 58-245917
Dec. 28, 1983 [JP] Japan ................................. 58-245918

[51] Int. Cl.⁴ .............................................. G03B 7/00
[52] U.S. Cl. .................................... 354/418; 354/419; 354/414; 354/484
[58] Field of Search ............ 354/418, 419, 484, 127.1, 354/127.12, 414

[56] References Cited

U.S. PATENT DOCUMENTS

| | | | |
|---|---|---|---|
| 4,309,092 | 1/1982 | Kitagawa | 354/484 |
| 4,348,087 | 9/1982 | Ellin et al. | 354/127.12 |
| 4,460,264 | 7/1984 | Winter | 354/484 |
| 4,464,039 | 8/1984 | Ishida | 354/418 |

Primary Examiner—Russell E. Adams
Attorney, Agent, or Firm—Toren, McGeady & Associates

[57] ABSTRACT

The present patent application discloses a reactuating device for a strobe having brightness level detecting apparatus for detecting the brightness level of an object to be photographed to determine whether or not flash illumination is necessary, and (or) charging-incompletion detecting apparatus for detecting that the storage capacitor in the strobe is not fully charged, whereby when the brightness level of the object becomes so low that strobe photography is necessary, and (or) when the strobe is not fully charged, as soon as this is detected, a charging of the strobe begins.

41 Claims, 7 Drawing Figures

STROBE RE-ACTUATING DEVICE

BACKGROUND OF THE INVENTION

1. Field of the Invention

This invention relates to improvements of strobe re-actuating devices, and more particularly to methods for advantageously controlling actuation of strobe charging.

2. Description of the Prior Art

Recently, a camera having an automatic actuation type strobe in which, as it darkens, shooting is automatically accompanied by a firing of the strobe has been proposed, and it is becoming possible to always obtain properly exposed shootings without the necessity of elaborate management. In this automatic firing type probe, to insure that firing can take place at any time the main condenser for storing a charge which is convertible to flashed light must always be fully charged after the preceding exposure has been completed. For this purpose, a method is known for actuating the DC/DC converter each time the release button moves backward from ON to OFF at the first stroke, or the film is advanced one frame (U.S. Pat. No. 4,441,774). By this method, the strobe is always ready for the next exposure with flash illumination. As a result, in a continuous series of flash exposures, improvement of the frame speed is achieved.

Since the use of this method, however, provides recyclic actuation of the strobe for each shot without exception, it follows that even if the strobe was not fired with the preceding exposure since the object is very bright, the DC/DC converter is recyclically actuated, thereby being at a disadvantage in that premature consumption of the battery results. Therefore, the total number of flash exposures per one battery charge is reduced. Another disadvantage arising from premature consumption of the parts concerning the charging of the strobe is that the number of faulty operations is increased. Furthermore, because the re-actuating operation has to be carried out regardless of what charging condition the strobe is in, even if the strobe remains in the fully charged condition, or the brightness level is so high as not to necessitate flash illumination, the photographer must wait a certain time before the next daylight exposure. Thus, there has been a problem of increasing the time interval between two successive daylight exposures.

A first object of the invention is to eliminate the above-described conventional problems and to provide a strobe re-actuating device for a camera capable of preventing wasteful strobe charging actuation from being recycled when the strobe is in the fully charged state, or the brightness level of an object to be photographed does not necessitate the strobe, thereby the life time of the battery is increased, and the shooting speed is improved.

This and other objects and features of the invention will become apparent from the following descriptions of the embodiments thereof.

SUMMARY OF THE INVENTION

An actuating device for charging a strobe including discriminating means for discriminating whether or not it is necessary to fire the strobe from the state of incident light, charging state detecting means for detecting the charging state of the strobe, and charging actuation means for applying charging actuation to the strobe when the necessity of firing the strobe is determined to be by the discriminating means and when an incomplete charging state of the strobe is detected by the charging state detecting means.

To achieve the above-stated object, according to the present invention, the strobe actuating device is provided with brightness level detecting means for sensing the object brightness level to determine whether flash illumination is necessary and/or charging incompletion detecting means for detecting that the strobe is not fully charged in combination with means for controlling the recyclic actuation of the strobe whereby only when the brightness level of the object becomes so low as to necessitate strobe photography, and/or when the strobe is not fully charged, charging actuation is applied to the strobe.

DETAILED DESCRIPTION OF THE PREFERRED EMBODIMENTS

The present invention will next be described in conjunction with embodiments thereof.

Figure 1:
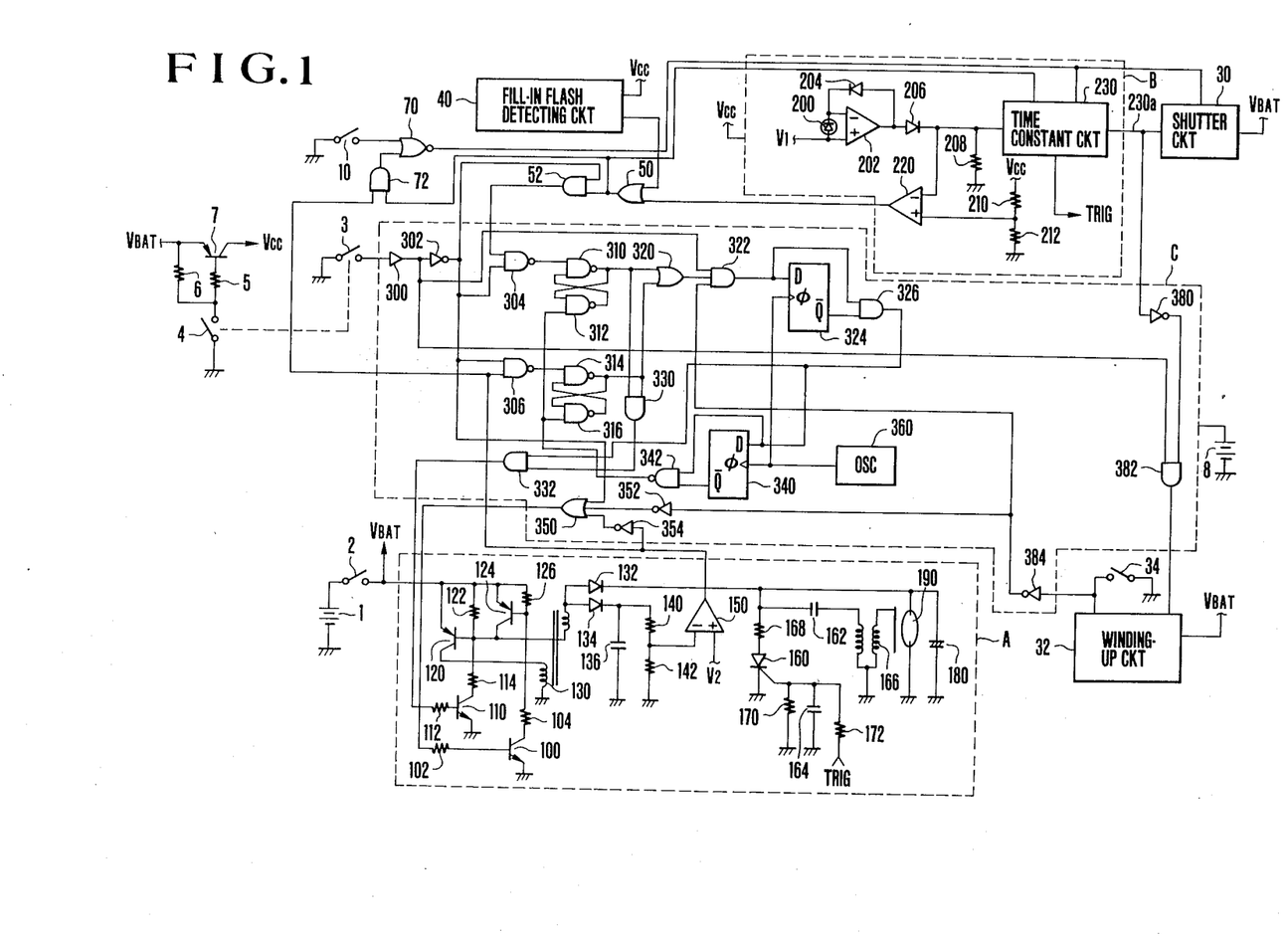
FIGS. 1 to 7 are electrical circuit diagrams of the respective first to seventh embodiments of strobe re-actuating devices according to the present invention.

FIG. 1, in a circuit construction diagram, illustrates a first embodiment of a strobe re-actuating device according to the present invention.

An electrical power source or battery 1 is connected to a shutter circuit 30 for opening and closing a shutter (not shown), a film winding-up circuit 32 for advancing film by one frame and a strobe circuit A through a main switch 2, which is manually turned on in both flash and daylight photography. Switches 3 and 4 turn on when a release button is pushed down a first stroke. When the switch 4 is turned on, current flows to resistors 5 and 6, thereby a transistor 7 is turned on and a potential of Vcc appears at the collector thereof. This potential Vcc functions as an electrical power source of an exposure control circuit B for controlling the exposure automatically in accordance with the object brightness and a fill-in flash detecting circuit 40 for determining whether the object is with fill-in flash illumination. Another battery 8 is used in separate from the aforesaid battery 1 to back up an actuation control circuit C for controlling the initiation of a charging operation of the strobe.

At first, an explanation is made as to discriminating whether the charging of a main condenser of the strobe has been completed. In the strobe circuit A, a transistor 100 is assumed to be OFF, and another transistor 110 for actuation to be ON. Then, a transistor 120 for oscillation is ON and another transistor 124 is OFF. In the figure, the transistors 120 and 124, resistors 122 and 126 and a transformer 130 constitute a booster or DC/DC converter. Note, resistors 102, 104, 112 and 114 constitute a current limiting circuit. When the transistor 120 is ON, current from the battery 1 flows to the primary winding of the transformer 130, causing the secondary winding to produce a high voltage at the anodes of diodes 132 and 134. Thereby at the cathodes of the diodes 132 and 134 there appears a voltage lowered by 1 Vf. This voltage 1 Vf is smoothed by a condenser 136 and is applied to a voltage divider of resistors 140 and 142. The output of the voltage divider is compared with a constant voltage V2 by a comparator 150 when the voltage stored on a main condenser 180 reaches a level which is satisfactory to produce an output signal of low level (hereinafter abbreviated to "L" level). When this level L is not reached, the comparator 150 produces a high level output signal (hereinafter abbreviated to "H" level). The elements 120 to 150 in such a construction and arrangement make it possible to determine whether or not the strobe is fully charged. In the figure, a thyristor 160, condensers 162 and 164, a trigger transformer 166, and resistors 168, 170 and 172 constitute a trigger circuit. When its TRIG-terminal becomes H level, the thyristor 160 turns on, whereby the charge on the condenser 162 is discharged. Since this excites the transformer 166, a high voltage appears at the secondary windng in impulsed form and xenon tube 190 is fired by the charge of the main condenser 180. Thus flash light is emitted.

Next explanation is given to a circuit for brightness discimination of an object to be photographed.

In the exposure control circuit B, photo-current from a photo-diode 200 is converted to a logarithmically compressed voltage by an amplifier 202 and a diode 204. This voltage, after being processed by a level shift diode 206 and a resistor 208, is compared with a reference level obtained by dividing the Vcc with the use of resistors 210 and 212 by a comparator 220 when the object brightness drops below the reference level to produce an output signal of H level since a so-called under-exposure warning signal 230 is a time constant circuit of known construction for making up a period of current supply to the shutter circuit 30. Another function of this circuit 230 is to produce the aforesaid TRIG signal in synchronization with the termination of the period of current supply to the shutter circuit 30 when the object is dim or illuminated with fill-in flash. A switch 10 turns on when the release button is depressed a second stroke, and its ON signal actuates an initiation of an operation of the shutter. An output 230a is maintained at H level for the time defined by the time constant circuit 230.

When the output 230a changes to an L level, the output of an inverter 380 in a control circuit to be described later changes to H level. When the switch 3 turns off, an AND gate 382 then changes its output to H level. Responsive to this, the winding-up circuit 32 moves the exposed film frame away from the exposure gate, while the fed film is wounded up on a takeup spool. At the termination of each cycle of the winding operation, a switch 34 is turned on.

The front-lit (or fill-in flash) condition detecting circuit 40 operates in a similar manner to that known to those skilled in the art, as, for example, in U.S. Pat. No. 4,357,084 where, since a daylight exposure is to be made, when the output of a spot meter responsive to the central area of the viewfield is far smaller than that of an entire field-of-view meter, the lighting situation is determined to be front-lit (with bright back scene), thereby a fill-in flash exposure is carried out. In the embodiment of the invention, upon detection of the fill-in flash condition, the circuit 40 produes an H level output.

Next, explanation is given to an actuation control circuit for controlling the initiation of a charging operation of the strobe depending on combinations of the states of the outputs of the strobe circuit A, the exposure control circuit B and the fill-in flash detecting circuit 40.

Case 1: If the strobe circuit A is not fully charged, this occurs along with when the exposure control circuit B detects the low object brightness, and when the fill-in flash detecting circuit 40 detects the fill-in flash condition.

Hence, the output of the comparator 150 in the strobe circuit A becomes H level, and either the output of the comparator 220 in the exposure control circuit B, or the output of the fill-in flash detecting circuit 40 takes an H level. Thereby, the output of an OR gate 50 is changed to H level. With the switch 3 ON since the release button has been pushed a first stroke, an AND gate 52 then produces an H level output. In this condition, the output of a NAND gate 304 is L level. Responsive to this, a first latch circuit of NAND gates 310 and 312 produces an H level output. Also, the output of a NAND gate 306 is L level. Responsive to this, a second latch circuit of NAND gates 314 and 136 also produces an H level output. Note, the outputs of both latch circuits are maintained at an L level until the outputs of the NAND gates 304 and 306 change to L level. The outputs of H level from the NAND gates 310 and 314 in the first and second latch circuits respectively are applied through an OR gate 320 to an AND gate 322 of which the other two inputs are connected respectively to the output of the switch 34 in the winding-up circuit 32 through an inverter 384 and to the output of the switch 3. When the switch 3 is OFF and when the switch 34 is ON since the one-frame winding has been completed, the output of the AND gate 322 changes to an H level. Responsive to this, a one-shot circuit comprising a D type flip-flop 324 and an AND gate 326 produces a pulse of short duration timed with a clock signal from an oscillator 360. Since the outputs of both latch circuits are H level, because the output of an AND gate 330 is H level, the output of an AND gate 332 changes to and is maintained at an H level for the short time. Thus, the transistor 110 for actuating the strobe circuit A is turned on. Meanwhile, it is at this time that the output of an OR gate 350 is L level because the switch 3 is OFF, the switch 34 is ON since the one-frame winding has been completed, and the output of the comparator 150 is H level since the strobe circuit A is not fully changed, and, therefore, the transistor 100 is OFF. In conclusion, the DC/DC converter begins to operate.

Another one-shot circuit comprising a D-type flip-flop 340 and a NAND gate 342 is caused by the aforesaid actuating signal from the AND gate 326 to produce, in a time delayed from the actuating signal, an L level output for resetting both of the latch circuits of the NAND gates 310, 312, 314 and 136 in time with the clock signal from the oscillator 360.

Case 2: The strobe circuit A is fully charged. Then, the output of the comparator 150 is L level. Despite the switch 3 being turned on, the output of the NAND gate 306 remains H level, leaving the output of the second latch circuit of the NAND gates 314 and 316 unchanged from L level. Therefore, the outputs of the AND gates 330 and 332 are L level, and the transistor 110 remains OFF. Thus, the DC/DC converter is not actuated.

Case 3: The brightness of the object is not low and no back lighting takes place. Then, the output of the comparator 220 is L level and the output of the fill-in flash detecting circuit 40 is L level. Therefore, the outputs of the OR gate 50 and the AND gate 52 are L level, causing the output of the NAND gate 304 to remain at an H level and therefore causing the output of the first latch circuit to remain at an L level. Therefore, the outputs of the AND gates 330 and 332 are L level, leaving the transistor 110 OFF. Thus, the DC/DC converter is not actuated.

Case 4: The above-described cases 2 and 3 occur at the same time. That is, the output of the comparator 150 is L level and the output of the OR gate 50 is L level. Therefore, the outputs of the first and second latch circuits remain L level. In this case too, as a matter of course, the transistor 110 is left OFF, hindering actuation of the DC/DC converter.

The transistor 100, which stops the oscillation of the DC/DC converter of the strobe circuit A, is turned on by the output of the OR gate 350. This can be done in three ways, or when the switch 3 is ON, that is, the release button is pushed down a first stroke, the switch 34 of the winding-up circuit 32 is OFF with the output of the inverter 32 taking an H level, that is, during the winding operation the main condenser 180 of the strobe is fully charged so that the output of the comparator 150 becomes L level and the output of the inverter 354 becomes H level. It should be pointed out that the reason why the DC/DC converter of the strobe circuit A is not driven both at the time of the first stroke on the release button and during the winding operation is that charging would otherwise affect the other operations such as the automatic focusing operation and the motorized winding operation. Also the reason why that driving is stopped when charging of the strobe is completed is that more than enough charging would otherwise take place resulting in premature consumption of electrical energy of the battery 1.

When the release button is depressed a second stroke, the switch 10 is turned on. In order to prevent underexposure because the strobe is not fully charged although the given photographic situation necessitates flash illumination, there is provided a NOR gate 70 having two inputs, one which is connected to the output of the switch 10 and the other which is connected to the output of an AND gate 72. This AND gate 72 in turn is connected at its one input to the output of the comparator 150 and at the other input to the output of the OR gate 50 to which the detecting results for low brightness and the fill-in flash condition are applied.

A feature of the foregoing embodiment which is characteristic of the invention is that only when the necessity arises, actuation of charging of the strobe is permitted to take place. As the prerequisite for that actuation, use is made of two factors, namely, object brightness level information and strobe charge storage level information. That is, only when the photographic situation necessitates flash illumination and the strobe is not charged to the satisfactory firing level occur simultaneously, the charging control circuit of the strobe is actuated, thereby giving an advantage that the strobe operates efficiently. Specifically speaking, the prerequisite for allowing the strobe to be re-actuated is the combination of the fact that the main condenser 180 of the strobe circuit A is not charged to a prescribed voltage level and the fact that at least one exposure control circuit B and the fill-in flash detecting circuit 40 have detected the brightness level of the object as low or the ambient illumination as the fill-in flash condition. These two facts are memorized in the respective latch circuits of the NAND gates 310 to 316 in the actuation control circuit C, before determining whether or not the strobe should be actuated. Therefore, the present invention produces the advantage of removing those operations which occasionally become meaningless, such as even if the voltage stored on the main condenser 180 is high enough, the charging operation is recycled, or that when the object brightness is high, the strobe is of no use and the strobe is re-charged. Therefore, the life time of the electrical power source or battery 1 can be remarkably elongated, or the total number of film frames exposed with the use of the strobe per one battery change is greatly increased.

Another advantage of the invention is that with the main condenser 180 fully charged, if an exposure is made without firing the strobe, then the next shot can be taken closer to the preceding one than was possible with the conventional method. Thus, the snap-shooting capability is greatly improved.

Another feature of the invention found in the foregoing embodiment is that the strobe charge storage level and object brightness level information to be memorized are obtained just before an exposure is made or at a point in time when the release button is pushed down a first stroke (or when the switch 3 is turned on). Because the brightness information the object about to be photographed gives off is instantly taken as one of the factors for determining whether the strobe is re-actuated, there is an additional advantage of improving the accuracy of re-actuation control.

A second embodiment of the strobe re-actuating device according to the present invention is next described by reference to FIG. 2 where the same reference numerals have been employed to identify the parts similar to those shown in FIG. 1.

Figure 2:
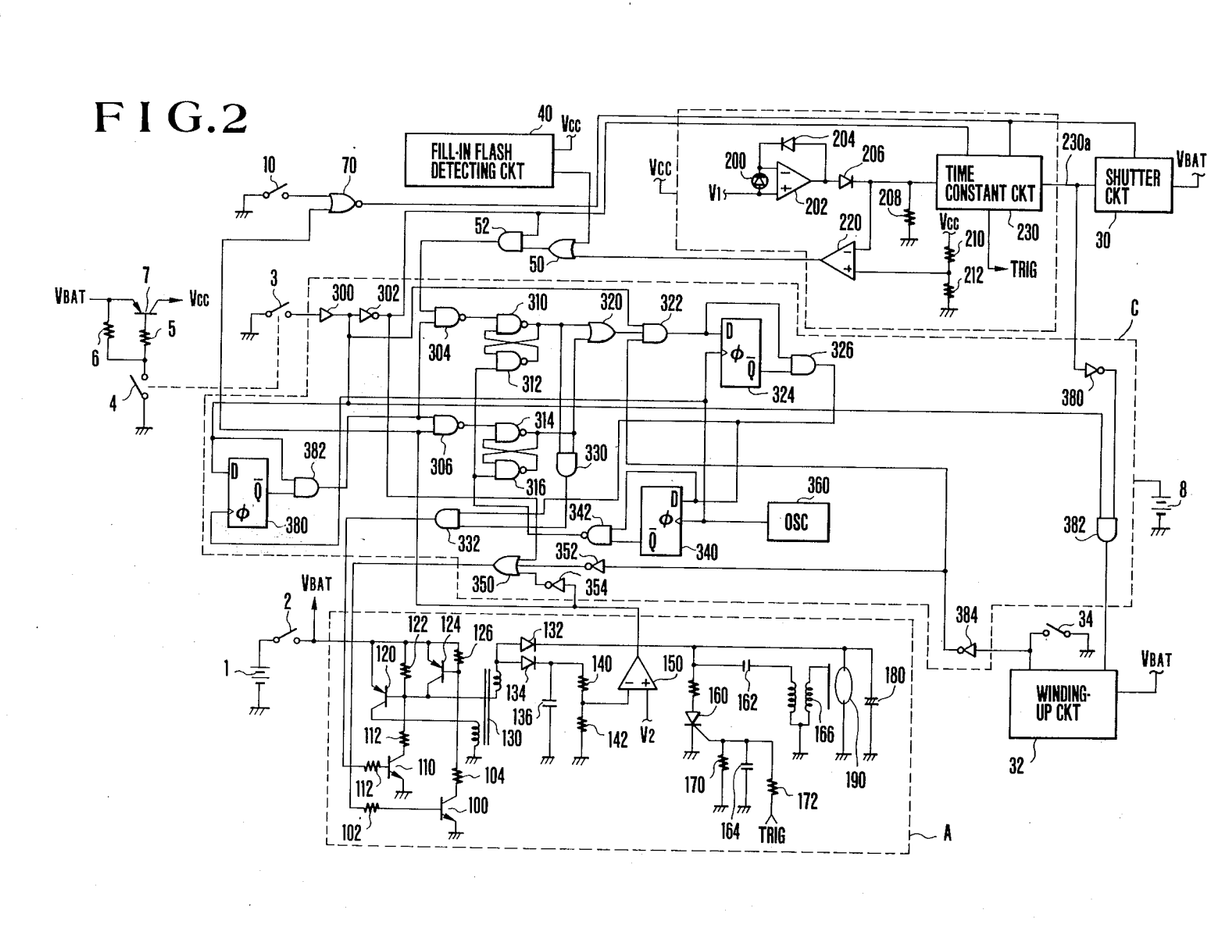

The circuit of FIG. 2 is different from that of FIG. 1 in that the three detecting operations for the charge level stored on the main condenser 180 of the strobe circuit A, the object brightness level in the exposure control circuit and the presence of a fill-in flash condition by the circuit 40 are each initiated when the release button is released, or when the switch 3 is turned off. That is, when the switch 3 responsible for the first stroke of movement of the release button is turned from ON to OFF, a one-shot circuit comprising a D type flip-flop 380 and an AND gate 382 produce a pulse of short duration in time with the clock signal from the oscillator 360. If, at this time, the comparator 150 of the strobe circuit A, because of the low charge level, produces an of H level output, and the comparator 220 of the exposure control circuit B, because of the low brightness level, or the fill-in flash detecting circuit 40 produces H level output, the NAND gates 304 and 306 then produce L level outputs. Responsive to these outputs, the respective latch circuits of the NAND gates 310, 312, 314 and 316 produce H level outputs. Therefore, a similar procedure to that described in the FIG. 1 embodiment succeeds. Thus, the actuating transistor 110 is turned on to initiate the charging operation of the strobe.

A feature of the second embodiment is that means is provided for sampling the charge level information from the strobe, the object brightness level information and the fill-in flash information, not when the release button is actuated, as in the first embodiment, but when de-actuated.

A third embodiment of the strobe re-actuating device according to the invention is next described by reference to FIG. 3 where the same reference numerals have been employed to identify the parts similar to those shown in FIG. 1.

Figure 3:
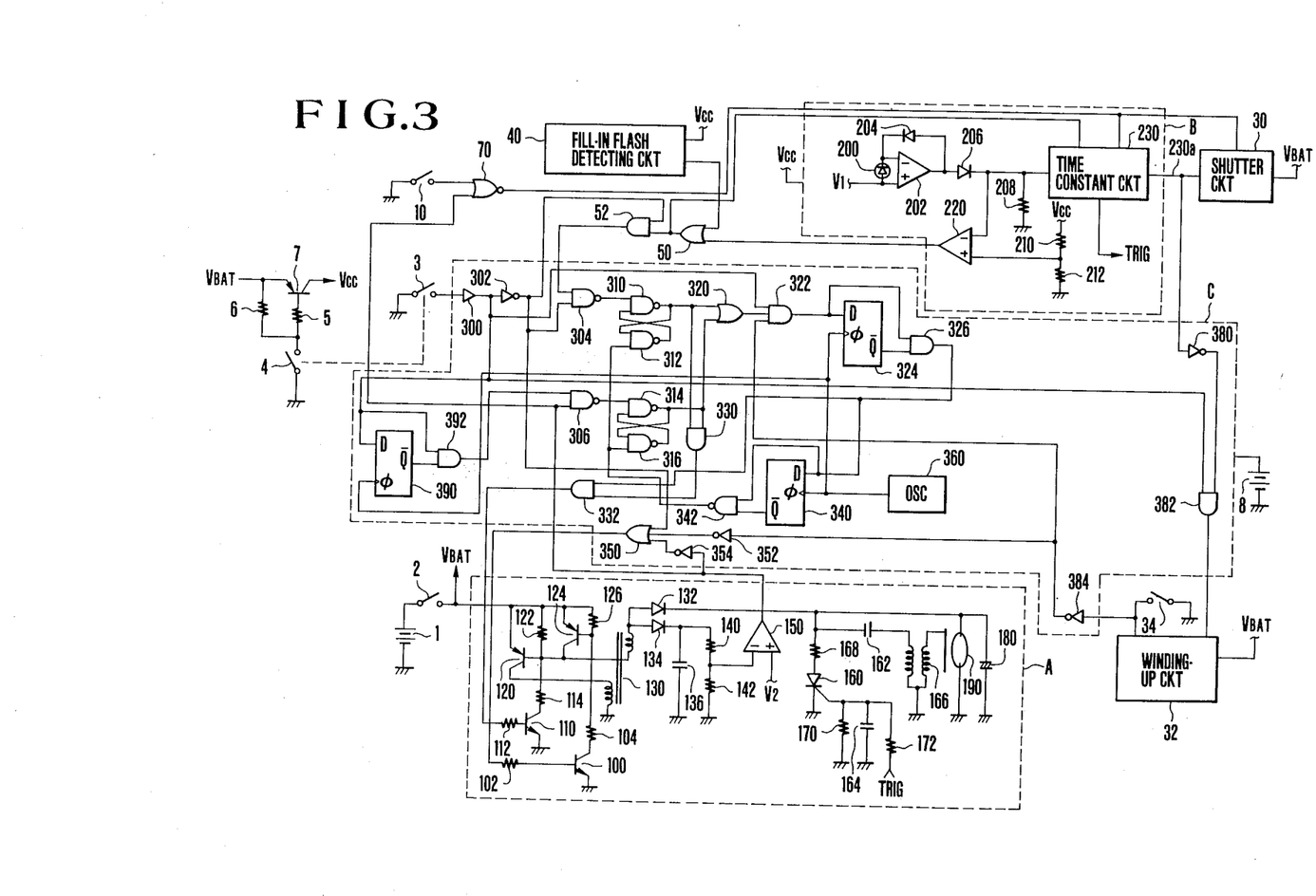

In the embodiment shown in FIG. 3, the low brightness of the object or the fill-in flash condition is detected when the release button is actuated, or in the timing of the turning-on of the switch 3, while the charge level of the main condenser 180 of the strobe circuit A is detected when the release button is de-actuated, or in the timing of turning-off the switch 3. In more detail, if it is when the switch 3 responsive to the first stroke of the release button is ON that the object is either of low brightness or in the fill-in flash condition, the NAND gate 304 produces the L level output, causing the latch circuit comprised of the NAND gates 310 and 312 to produce the H level output. Then when the release button is de-actuated, that is, when the switch 3 is turned from ON to OFF, the one-short circuit comprised of a D type flip-flop 390 and an AND gate 392 produces a pulse of short duration in a timing of the clock signal. If, at this time, the comparator 150 of the strobe circit A, because of the low charge level, produces the H level output, the NAND gate 306 produces the L level output, causing the latch circuit comprised of the NAND gate 314 and 316 to produce the H level output. Then, similar to the FIG. 1 embodiment, the actuating transistor 110 is turned on to initiate the charging operation of the strobe.

A feature of the thus-constructed third embodiment is that the timing to sample the stored charge level information of the strobe only is changed from that in the embodiment of FIG. 1 to coincidence with de-actuation of the release button. The other features are the same as in the embodiment of FIG. 1.

In the embodiments of FIGS. 2 and 3, because the charging condition of the strobe is detected at the termination of the exposure, if shooting is accompanied with the firing of the strobe, the photographer will wait a shorter time for the next flash exposure than in the embodiment of FIG. 1.

Note, the timing to sample the charging condition of the strobe, the brightness level of the object and the fill-in flash condition of the object may be other than that shown in the above-described embodiment. In application to the camera wherein the film winding operation is initiated soon after de-actuation of the release button, the above-described detection might be performed in time with the initiation or termination of the film winding operation. Other variations would also be possible.

Note, the timing to the actuation of charging of the strobe may be other than that shown in the above-described embodiments. For example, when the release button is de-actuated, an actuating signal is produced. Other variations would also be possible. Here, let us mention an example of means for producing the actuating signal for the charging of the strobe when the release button is deactuated. In FIG. 1, the output of the inverter 384, which is supplied to the AND gate 322, may be cancelled.

Note, the use of the memory means for memorizing the output signals from the brightness level detecting means and the stored charge level detecting means becomes necessary when a time lag is set forth between the detection time of the aforesaid two detecting means and the output timing of the subsequent actuating signal for charging. Besides the combination of the latch circuit and the AND gate 332 illustrated in the embodiment, other variations are also possible.

Figure 4:
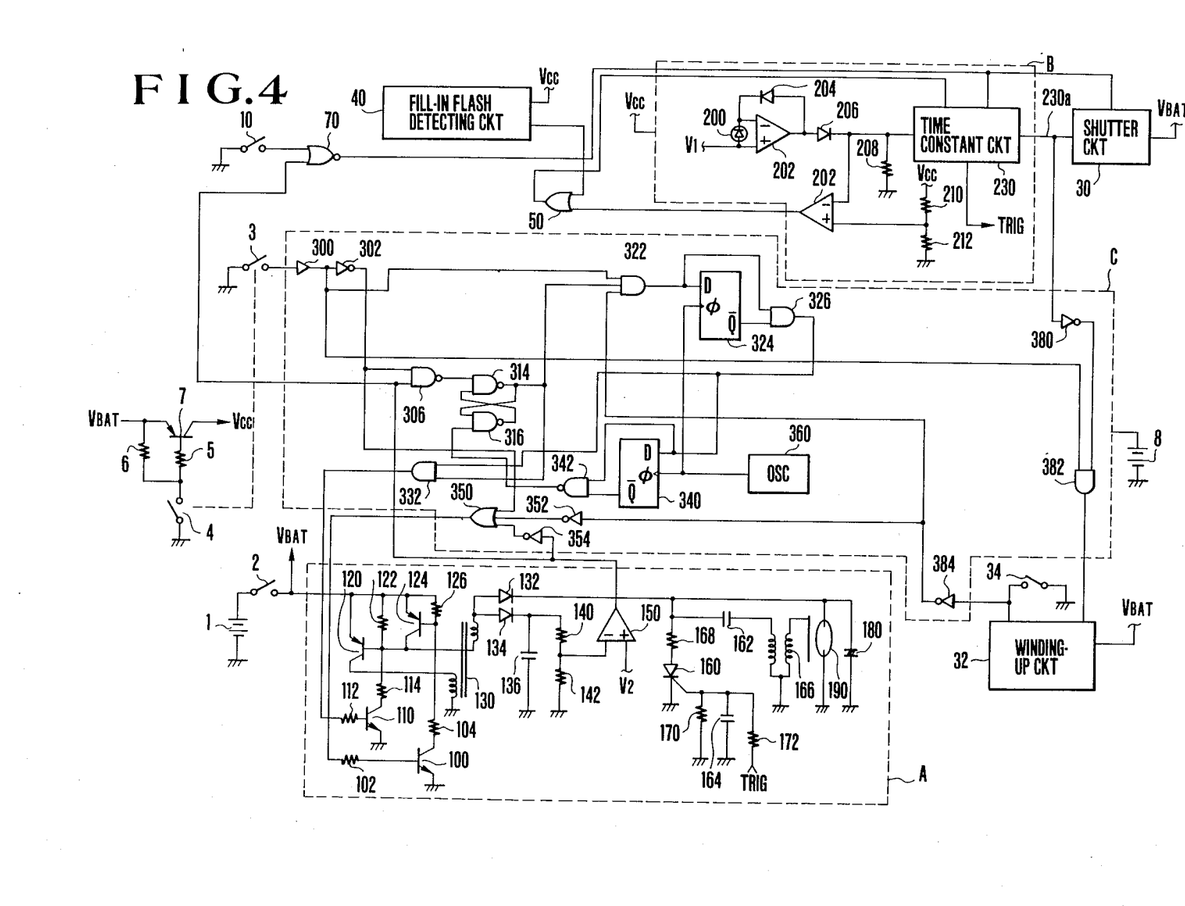

A fourth embodiment of the strobe re-actuating device according to the invention is shown in FIG. 4, wherein the same reference numerals have been employed to identify parts similar to those shown in FIG. 1.

What is illustrated in FIG. 4 is that, regardless of what brightness level the object has, at any time when the incompletion of charging of the strobe is detected the charging circuit A of the strobe is actuated.

That is, at first, as in case 1, explanation is given about operation under the condition that the strobe circuit A is not fully charged. In this condition, the output of the comparator 150 of the strobe circuit A is an H level. If, as the release button is pushed down a first stroke, the switch 3 is ON, the output of the NAND gate 306 becomes L level, causing the latch circuit comprised of the NAND gates 314 and 316 to produce the H level output. This H level output from the latch circuit is applied to the AND gate 322. Since this AND gate 322 is supplied at the other two inputs thereof with the output of the switch 34 in the winding-up circuit 32 through the inverter 384 and also the output of the switch 3, the output of the AND gate 322 becomes H level when the switch 3 is OFF and when the switch 34 is ON as the winding is completed. With the output of the AND gate 322 becoming H level, the one-shot circuit comprised of the D type flip-flop 324 and the AND gate 326 produces a pulse of short duration in a timing of the clock signal of the oscillator 360. The AND gate 332 receptive of the H level output from the aforesaid latch circuit and the H level output from the one-shot circuit produces an output of H level which turns on the transistor 110 to actuate the strobe circuit A. At this time, the output of the OR gate 350 is L level, because the switch 3 is OFF, because, as the one-frame winding is completed, the switch 34 is ON, and because, as the strobe circuit A is not fully charged yet, the output of the comparator 150 is H level. Therefore, the transistor 100 is OFF. Thus, the DC/DC converter is actuated.

In a time delayed from the aforesaid actuation signal, the one-shot circut comprised of the D type flip-flop 340 and the NAND gate 342 produces an L level output for resetting the latch circuit comprised of the NAND gates 314 and 316 in the timing of the clock signal of the oscillator 360. Therefore, the aforesaid latch circuit is reset.

Next, as in case 2, an explanation is made of a condition in which the strobe circuit A is fully charged. The output of the comparator 150 becomes L level, causing the output of the NAND gate 306 to remain H level despite the switch 3 being turned on. Therefore, the output of the latch circuit comprised of the NAND gates 314 and 316 remains at L level. Therefore, the output of the AND gate 332 is L level, leaving the transistor 110 OFF. Thus, the DC/DC converter is not actuated.

In the meantime, the output of the switch 10, which is turned on when the release button is pushed a second stroke, is rendered effective or ineffective by the NOR gate 70. The opposite input of the NOR gate 70 is connected to the output of the comparator 150 of the strobe circuit A so that an exposure is hindered from being made when the strobe is not fully charged.

A feature of the thus-constructed embodiment of FIG. 4 is that only when the necessity arises, charging actuation of the strobe is carried out. As the prerequisite for that actuation, use is made of the stored charge level information of the strobe. When the release button is pushed down the first stroke, the charging condition of the strobe is examined. If charging actuation of the strobe is necessary, an actuating signal for charging of the strobe is produced when the film winding operation is terminated.

A fifth embodiment of the strobe re-actuating device according to the present invention is next described by reference to FIG. 5 where the same reference numerals have been employed to identify parts similar to those shown in FIG. 4, and their detailed explanation is omitted.

Figure 5:
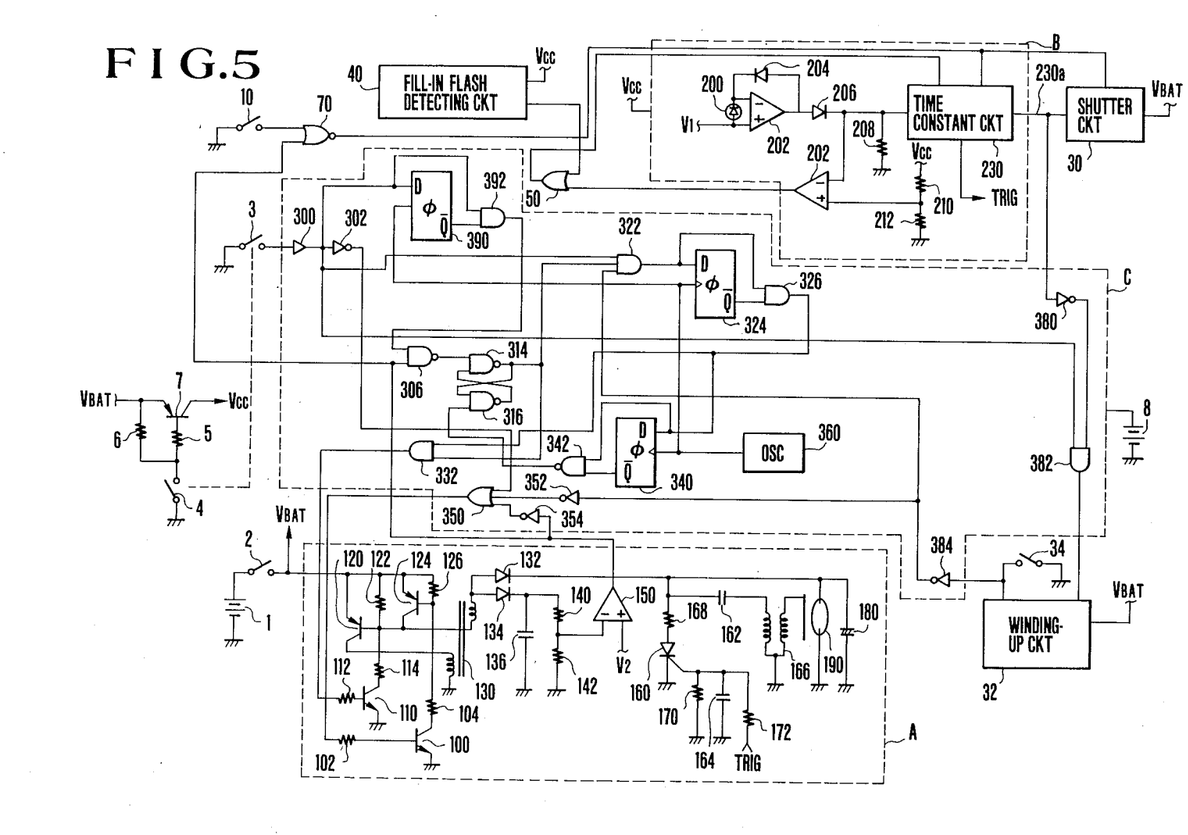

The embodiment shown in FIG. 5 shows that the charging condition of the main condenser 180 of the strobe circuit A is detected after de-actuation of the release button, or at a time when the switch 3 turns from ON to OFF. That is, when the switch 3 responsive to the first stroke of the release button turns from ON to OFF, the one-shot circuit comprised of the D type flip-flop 390 and the AND gate 392 produces a pulse of short duration in the timing of the clock signal of the oscillator 360. If, at this time, the comparator 150 of the strobe circuit A, because of a low charge level, produces an H level output, the NAND gate 306 produces an L level output, causing the latch circuit comprised of the NAND gate 314 and 316 to produce an H level output. Then, similar to the above-described embodiment of, FIG. 4 the transistor 110 is turned on to actuate the charging of the strobe.

A feature of the thus-constructed fifth embodiment is that the timing to sample the stored charge level information of the strobe is set in coincidence, not with the time of actuation of the release button as in the fourth embodiment, but with the de-actuation of the release button. The other operations are similar to those of the above-described embodiment.

In the fifth embodiment, because the charging actuation of the strobe is controlled in accordance with that charging condition of the strobe which takes place just after termination of the exposure, the time gap between the successive two flash exposures is shorter than that in the above-described embodiment of FIG. 4. The other fundamental effects are the same as those in the embodiment of FIG. 4.

Note, the timing to sample the stored charge level of the strobe may be different from those described in connection with FIGS. 4 and 5, provided that it substantially coincides with a time during the photographic operation such as the movement of the release button. In application to the camera in which the film is wound up soon after the termination of the exposure, despite the release button remaining depressed, the aforesaid sampling may be made coinciding with the initiation or termination of the film winding operation. It is to be understood that this feature also falls in the concept of the present invention.

Note, the timing to actuate the charging of the strobe may be otherwise possibe than those shown in FIGS. 4 and 5. For example, the actuating signal is produced when the release button is de-actuated. Here, let us mention an example of modification with means for producing the actuating signal for the charging of the strobe when the release button is released. In FIG. 5, this can be done by cancelling the output of the inverter 384 which is supplied to the AND gate 322.

The summary of the features of the fourth and fifth embodiments is that the stored charge level information of the strobe is sampled at a time during the photographic operation such as with the movment of the release button, and only when the stored charge level is determined to be insufficient, the charging circuit of the strobe is actuated, thereby giving an advantage that the charging of the strobe is recycled with the loss of electrical energy kept at a minimum. Therefore, the lifetime of the electrical power source or battery 1 can be elongated, and the number of frames exposed with flash illumination per one battery change can be increased.

Another advantage of the fourth and fifth embodiments is that if the exposure was made without the use of flash light despite the condenser 180 of the strobe circuit A being fully charged, then, because no recharging operation of the strobe takes place, the necessary time lag between this and the next exposures is shorter than that in the conventional device. Thus, the snap-shooting capability is improved.

Note, since, in the fourth and fifth embodiments, whether the charging circuit of the strobe is re-actuated is determined only by what stored charge level the strobe has, but always independent from the brightness level the object has, the circuits of FIGS. 4 and 5 have no equivalent means to those for putting the object brightness and fill-in flash information into examination of whether the charging circuit should be re-actuated.

A sixth embodiment of the strobe re-actuating device according to the present invention is next described by reference to FIG. 6 wherein the same reference numerals have been employed to identify parts similar to those shown in FIG. 1, and their detailed explanation is omitted.

Figure 6:
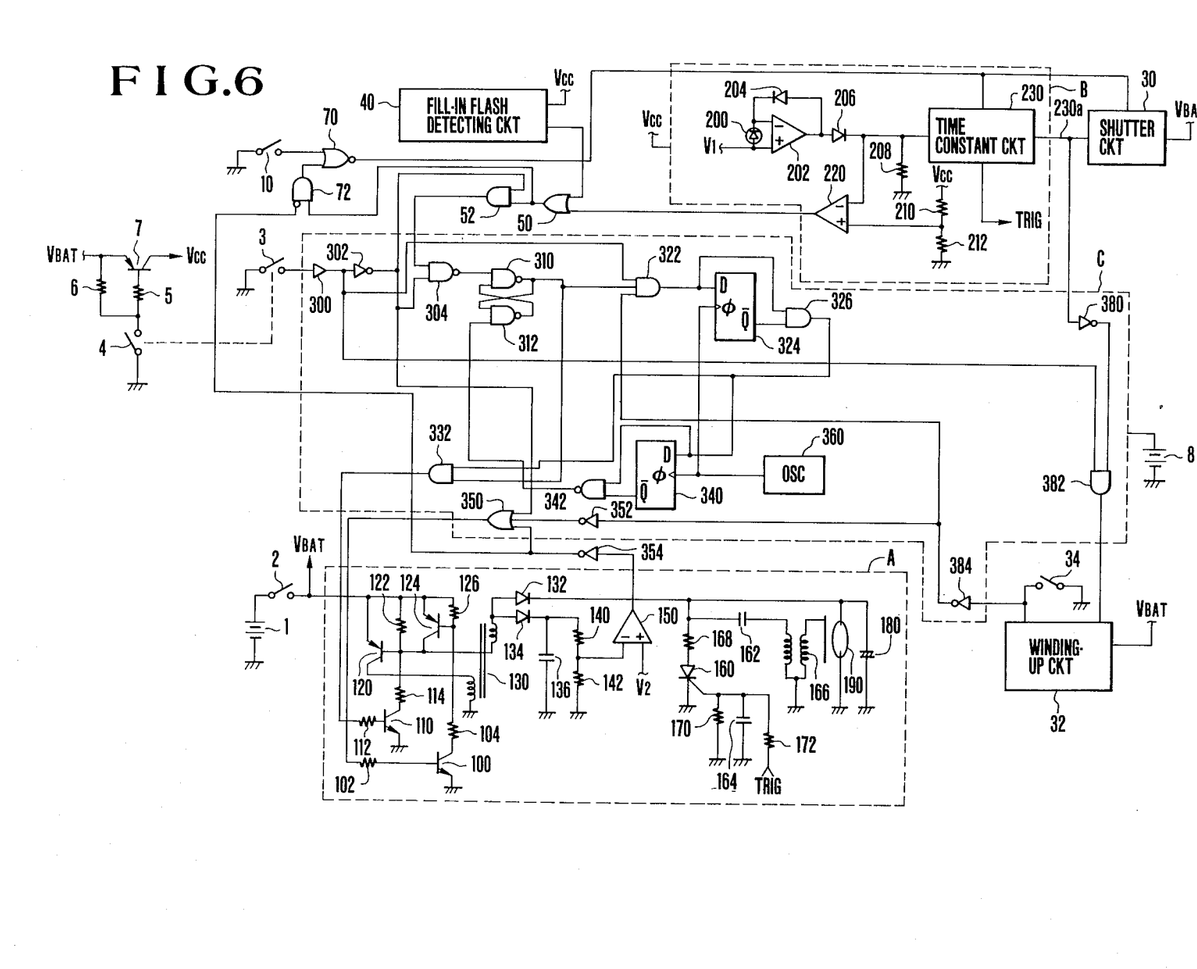

What is illustrated in FIG. 6 is that regardless of what stored charge level the strobe has, it is when the object has a brightness level which necessitates the use of flash light from the strobe that charging actuation of the strobe takes place. That is, at first, as in case 1, explanation is given to the operation under the condition that the object is of low brightness or in the fill-in flash condition. In this condition, either the output of the comparator 220 of the exposure control circuit B takes an H level, or the output of the fill-in flash detecting circuit 40 takes an H level. Therefore, the output of the OR gate 50 becomes H level. Then, when the switch 3 is turned on in response to the first stroke of movement of the release button, the output of the NAND gate 304 changes to an L level, causing the latch circuit comprised of the NAND gate 310 and 312 to produce the H level output. This output is applied to the AND gate 322. Since this AND gate 322 is supplied at its other two inputs with the output of the switch 34 of the winding-up circuit 32 through the inverter 384, and the output of the switch 3, it is under the condition that the switch 3 is OFF, and, since winding is completed, the switch 34 turns on that the one-shot circuit comprised of the D type flip-flop 324 and the AND gate 326 produces a pulse of short duration in the timing of the clock signal of the oscillator 360. The AND gate 332 receptive of the H level output from the aforesaid latch circuit and the pulse from the one-shot circuit changes its output to H level, whereby the transistor 110 for actuating the strobe circuit A is turned on. Also since, at this time, the output of the OR gate 350 is L level because the switch 3 is OFF, because, since the one-frame winding is completed, the switch 34 is ON, and because, since the strobe circuit A is not fully charged, the output of the comparator 150 is at an H level, the transistor 100 is OFF. In conclusion, the DC/DC converter is actuated.

In a time delayed from the aforesaid actuating signal, the one-shot circuit comprised of the D type flip-flop 340 and the AND gate 342 produces an L level output for resetting the latch circuit comprised of the NAND gates 310 and 312 in the timing of the clock signal of the oscillator 360. Therefore, the aforesaid latch circuit is reset.

Next, as in case 2, explanation is given to the operation under the condition that the object is neither of low brightness, nor in the fill-in flash condition. The output of the comparator 220 of the exposure control circuit B is L level, and the output of the fill-in flash detecting circuit 40 is also L level. Therefore, the output of the OR gate is L level. Regardless of whether the switch 3 is ON, the output of the NAND gate 304 remains H level, and the output of the latch circuit comprised of the NAND gatess 310 and 312 remains L level. The output of the AND gate 332 also results in an L level, leaving the actuating transistor 110 OFF. Thus, the DC/DC converter is not actuated.

In the meantime, the output of the switch 10, which is turned on in response to the second stroke of movement of the release button, is rendered either effective or ineffective by the NOR gate 70. The input terminals of this NOR gate 70 are supplied with the output of the switch 10 and the output of the AND gate 72 of which the input terminals are supplied with the output of the comparator 150 for detecting the low stored charge level of the strobe and the output of the OR gate which represents the detecting results of the low brightness and fill-in flash condition of the object. For the photographic situation which necessitates flash illumination, when the strobe is not fully charged yet, exposure is not possible.

A feature of the thus-constructed embodiment of FIG. 6 is that only when the necessity arises, the charging circuit of the strobe is actuated. As the prerequisite for that actuation, the brightness level information (low brightness warning, fill-in flash condition) of the object is used. The brightness level of the object is determined at the time of the first stroke of movement of the release button, and, if the exposure has to be made in the flash mode, it is when the film winding operation is completed that the actuating signal for charging of the strobe is produced.

A seventh embodiment of the strobe re-actuating device according to the present invention is next described by reference to FIG. 7, wherein the same reference numerals have been employed to denote the similar parts to those shown in FIG. 6, and their detailed explanation is omitted.

Figure 7:
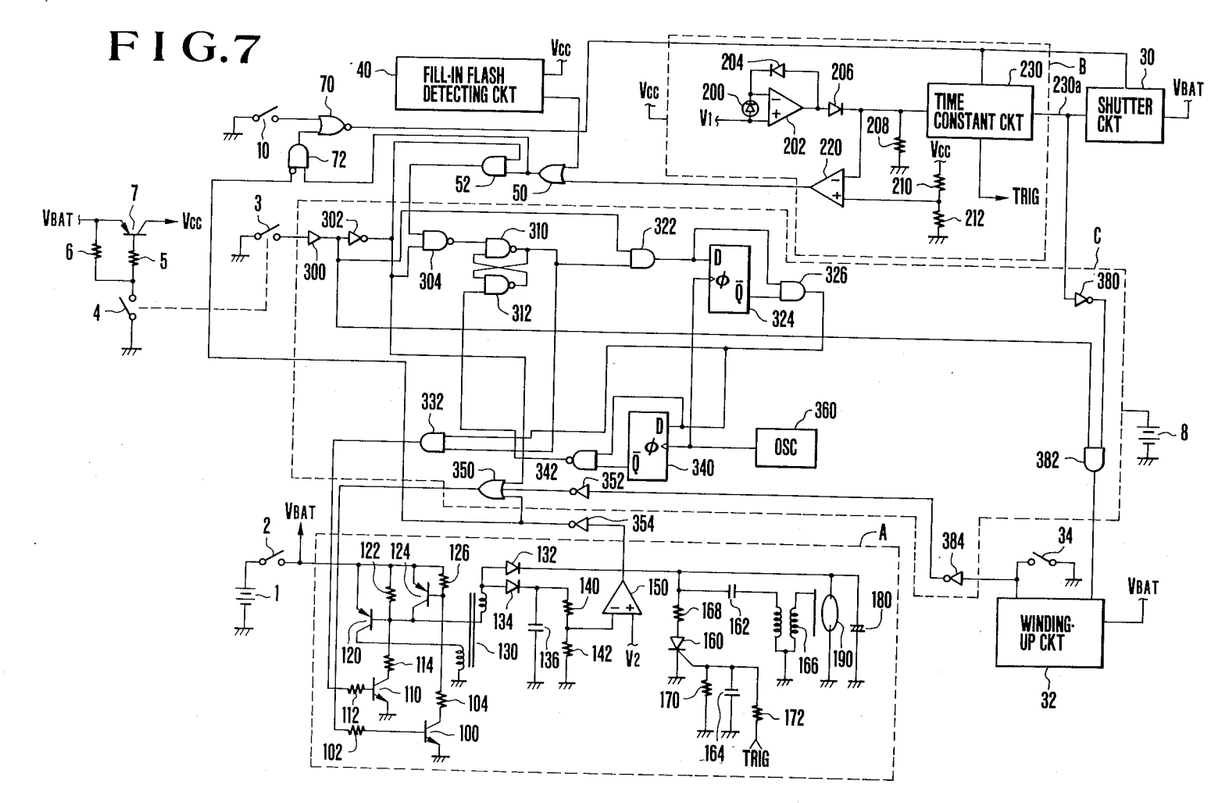

The embodiment illustrated in FIG. 7 is that the timing to actuate the strobe circuit A is taken at a time after the release button is released from the depression, or when the switch 3 turns from ON to OFF. This can be done by modifying the embodiment of FIG. 6 in such a way that the output of the AND gate 322 is controlled by only the outputs of the switch 3 and the latch circuit comprised of the NAND gates 310 and 312. When the switch 3 responsive to the first stroke of the release button turns from ON to OFF under the condition that the aforesaid latch circuit produces the output of H level (low brightness or fill-in flash condition), the output of the AND gate 322 becomes H level. Thereby similarly to the embodiment of FIG. 6, the actuating signal for the charging of the strobe is formed.

The embodiment illustrated in FIG. 7 is different from the embodiment of FIG. 6 merely in the timing of the charging actuation of the strobe, and is similar thereto in the effects and advantages.

The summary of the features of the thus constructed sixth and seventh embodiments is that whether the object brightness level is low is determined at a time during the photographic operation such as the actuation of the release button, and, only when the object is of low brightness level (low warning or fill-in flash condition), the charging circuit of the strobe is actuated, thereby giving an advantage that the actuation of the strobe is recycled with the limitation of the amount of electrical energy consumed to a minimum. Therefore, the life time of the electrical power source or battery is elongated, and the number of shots with the use of the strobe per one-time battery exchange can be increased.

Another advantage of the sixth and seventh embodiments is that if the exposure was made without the use of flash light under the condition that the main condenser 180 of the strobe circuit A was fully charged, then because no more recharging operation of the strobe is necessary, the time lag between this exposure and the next flash exposure becomes shorter than when the conventional device is used. Thus, the snap-shooting capability is improved.

As has been described above, according to the present invention, use is made of brightness level detecting means for sensing the level of brightness of an object to be photographed to determine whether or not there is need to fire the strobe and/or stored charge level detecting means for determining whether or not the strobe is fully charged, whereby when the brightness level of the object has become so low as to necessitate strobe photography and/or when the strobe has been discharged, this is detected, and a charging actuation is applied to the strobe. Thus, ony when strobe light is necessary, actuation of charging is automatically effected. In strobe photography, therefore, the snap shooting capability and manageability are improved. In addition thereto, no wasteful charging actuation of the strobe takes place, increasing the life time of the electrical power source or battery with increase in the total number of shots with firing of the strobe a battery.

What is claimed is:

1. An actuating device for charging a strobe comprising:
   (A) discriminating means for discriminating whether or not it is necessary to fire the strobe from the state of incident light;
   (B) charging state detecting means for detecting the charging state of the strobe; and
   (C) charging actuation means for applying charging actuation to the strobe when the necessity of firing the strobe is determined to be by said discriminating means and when an incomplete charging state of the strobe is detected by said charging state detecting means.

2. A device according to claim 1, wherein said charging actuation means includes charging re-actuation means for applying charging re-actuation to the strobe.

3. A device according to claim 1, wherein said discriminating means includes low brightness detecting means responsive to when the incident light was low brightness for determining by this that there is the necessity of firing the strobe.

4. A device according to claim 1, wherein said disciminating means includes fill-in flash detecting means responsive to when the incident light was in fill-in flash condition for determining by this that there is need to fire the strobe.

5. A device according to claim 1, wherein said discriminating means includes condition detecting means for carrying out a discriminating operation during the shutter release actuation.

6. A device according to claim 1, wherein said charging state detecting means includes condition detecting means for carrying out a detecting operation during the shutter release actuation.

7. A device according to claim 1, further comprising:
state detecting means for causing a discriminating operation of said discriminating means and a detecting operation of said charging state detecting means to be performed during the shutter release actuation.

8. A device according to claim 1, wherein
said discriminating means includes condition detecting means responsive to first stroke of shutter release actuation of which a second stroke effects a shutter release for initiating said discriminating operation.

9. A device according to claim 1, wherein
said charging state detecting means includes condition detecting means responsive to first stroke of shutter release actuation of which a second stroke effects a shutter release for initiating said detecting operation.

10. A device according to claim 1, further comprising:
condition detecting means responsive to first stroke of shutter release actuation of which a second stroke effects a shutter release for initiating a discriminating operation of said discriminating means and a detecting operation of said charging state detecting means.

11. A device according to claim 1, wherein
said discriminating means includes condition detecting means for causing a discriminating operation to be performed when the shutter release is de-actuated.

12. A device according to claim 1, wherein
said charging state detecting means includes condition detecting means for causing a detecting operation to be performed when the shutter release is de-actuated.

13. A device according to claim 1, further comprising:
condition detecting means for causing a discriminating operation of said discriminating means and a detecting operation of said charging state detecting means to be performed when the shutter release is de-acuated.

14. A device according to claim 1, further comprising:
condition detecting means for causing a discriminating operation of said discriminating means to be performed during the actuation of a shutter release and for causing a detecting operation of said charging state detecting means to be performed when the shutter release is de-actuated.

15. A device according to claim 1, wherein
said discriminating means includes memory means for memorizing its discrimination result.

16. A device according to claim 1, wherein
said charging state detecting means includes memory means for memorizing its detection result.

17. A device according to claim 1, further comprising:
memory means for memorizing the discrimination result of said discriminating means and the detection result of said charging state detecting means.

18. A device according to claim 1, wherein
said charging actuation means includes co-ordinating means for acting in response to a photograhic operation.

19. A device according to claim 18, wherein
said co-ordinating means includes actuation prohibiting means for prohibiting said charging actuation means for performing an actuating operation until the shutter release is de-actuated.

20. A device according to claim 18, wherein
said co-ordinating means includes actuation prohibiting means for phohibiting said charging actuation means from performing an actuating operation until a winding operation is terminated.

21. A device according to claim 18, wherein
said co-ordinating means includes actuation prohibiting means for prohibiting said charging actuation means from performing an actuating operation until the shutter release is de-actuated and a winding operation is terminated.

22. A device according to claim 1, further comprising:
charging means responsive to action of said charging actuation means for initiating a charging of strobe firing energy.

23. A device according to claim 22, wherein
said charging means includes charging termination means responsive to shutter release actuation for stopping the charging even at a time during the charging operation.

24. A device according to claim 22, wherein
said charging means includes charging termination means responsive to winding operation for stopping the charging even at a time during the charging operation.

25. A device according to claim 22, further comprising:
release locking means for hindering a shutter release when said charging means is incomplete in charging, and when said discriminating means determines that there is need to fire the strobe.

26. An actuating device for charging a strobe, comprising:
(A) charging state detecting means for detecting the charging state of the strobe, said charging state detecting means includes condition detecting means responsive to first stroke of shutter release actuation of which a second stroke effects a shutter release for initiating said detecting operation; and
(B) charging actuation means for applying charging actuation to the strobe when an incomplete charging state of the strobe is detected by said charging state detecting means.

27. An actuating device for charging a strobe, comprising:
(A) charging state detecting means for detecting the charging state of the strobe, said charging state detecting means includes memory means for memorizing its detection result; and
(B) charging actuation means for applying charging actuation to the strobe when an incomplete charging stage of the strobe is detected by said charging state detecting means.

28. An actuating device for charging a strobe, comprising:
(A) charging state detecting means for detecting the charging state of the strobe; and
(B) charging actuation means for applying charging actuation to the strobe when an incomplete charging state of the strobe is detected by said charging state detecting means, said charging actuation means including co-ordinating means for acting in response to photographic operation, wherein said co-ordinating means includes actuation prohibiting means for prohibiting said charging actuation means for performing an actuation operation until the shutter release is de-actuated.

29. An actuating device for charging a strobe, comprising:
   (A) charging state detecting means for detecting the charging state of the strobe; and
   (B) charging actuation means for applying charging actuation to the strobe when an incomplete charging state of the strobe is detected by said charging state detecting means, said charging actuation means including co-ordinating means for acting in response to photographic operation, wherein said co-ordinating means includes actuation prohibiting means for prohibiting said charging actuation means from performing an actuation operation until a winding operation is terminated.

30. An actuating device for charging a strobe, comprising:
   (A) charging state detecting means for detecting the charging state of the strobe; and
   (B) charging actuation means for applying charging actuation to the strobe when an incomplete charging state of the strobe is detected by said charging state detecting means, said charging actuation means including co-ordinating means for acting in response to photographic operation, wherein said co-ordinating means includes actuation prohibiting means for prohibiting said charging actuation means from performing an actuation operation until the shutter release is de-actuated and a winding operation is terminated.

31. An actuating device for charging a strobe, comprising:
   (A) charging state detecting means for detecting the charging state of the strobe;
   (B) charging actuation means for applying charging actuation to the strobe when an incomplete charging state of the strobe is detected by said charging state detecting means; and
   (C) charging means responsive to action of said charging actuation means for initiating a charging of strobe firing energy, wherein said charging means includes charging termination means responsive to shutter release actuation for stopping the charging even at a time during the charging operation.

32. An actuating device for charging a strobe, comprising:
   (A) charging state detecting means for detecting the charging state of the strobe;
   (B) charging actuation means for applying charging actuatioon to the strobe when an incomplete charging state of the strobe is detected by said charging state detecting means; and
   (C) charging means responsive to action of said charging actuation means for initiating a charging of strobe firing energy, wherein said charging means includes charging termination means responsive to winding operation for stopping the charging even at a time during the charging operation.

33. A re-actuating device for charging a strobe comprising:
   (A) discriminating means for discriminating whether or not it is necessary to fire the strobe from the state of incident light; and
   (B) charging re-actuation means for applying charging re-actuation to the strobe when it is determined by said discriminating means that there is need to fire the strobe, and wherein said discriminating means includes fill-in flash detecting means responsive to when the incident light was back light for determining by this that there is need to fire the strobe.

34. A device according to claim 33, wherein
   said discriminating means includes condition detecting means for carrying out a discriminating operation during the shutter release actuation.

35. A re-actuating device for charging a strobe comprising:
   (A) discriminating means for discriminating whether or not it is necessary to fire the strobe from the state of incident light; and
   (B) charging re-actuation means for applying charging re-actuation to the strobe when it is determined by said discriminating means that there is need to fire the strobe, and wherein said discriminating means includes condition detecting means for causing a discriminating operation to be performed when the shutter release is de-actuated.

36. A re-actuating device for charging a strobe comprising:
   (A) discriminating means for discriminating whether or not it is necessary to fire the strobe from the state of incident light; and
   (B) charging re-actuation means for applying charging re-actuation to the strobe when it is determined by said discriminating means that there is need to fire the strobe, and wherein said charging actuation means includes coordinating means for acting in response to a photographic operation, and wherein said coordinating means includes actuation prohibiting means for prohibiting said charging actuation means from performing an actuating operation until the shutter release is de-actuated.

37. A re-actuating device for charging a strobe comprising:
   (A) discriminating means for discriminating whether or not it is necessary to fire the strobe from the state of incident light; and
   (B) charging re-actuation means for applying charging re-actuation to the strobe when it is determined by said discriminating means that there is need to fire the strobe, and wherein said charging actuation means includes coordinating means for acting in response to a photographic operation; and wherein said coordinating means includes actuation prohibiting means for prohibiting said charging actuation means from performing an actuating operation until a winding operation is terminated.

38. A re-actuating device for charging a strobe comprising:
   (A) discriminating means for discriminating whether or not it is necessary to fire the strobe from the state of incident light; and
   (B) charging re-actuation means for applying charging re-actuation to the strobe when it is determined by said discriminating means that there is need to fire the strobe, and wherein said charging actuation means includes coordinating means for acting in response to a photographic operation; and wherein said coordinating means includes actuation prohibiting means for prohibiting said charging actuation means from performing an actuating operation until the shutter release is de-actuated and a winding operation is terminated.

39. A re-actuating device for charging a strobe comprising:
   (A) discriminating means for discriminating whether or not it is necessary to fire the strobe from the state of incident light; and
   (B) charging re-actuation means for applying charging re-actuation to the strobe when it is determined by said discriminating means that there is need to fire the strobe, and including charging actuation means responsive to action of said charging actuation means for initiating a charging of strobe firing energy, and wherein said charging means includes charging termination means responsive to shutter release actuation for stopping the charging even at a time during the charging operation.

40. A re-actuating device for charging a strobe comprising:
   (A) discriminating means for discriminating whether or not it is necessary to fire the strobe from the state of incident light; and
   (B) charging re-actuation means for applying charging re-actuation to the strobe when it is determined by said discriminating means that there is a need to fire the strobe, including charging actuation means responsive to action of said charging actuation means for initiating a charging of strobe firing energy, and wherein said charging means includes charging termination means responsive to winding operation for stopping the charging even at a time during the charging operation.

41. A shutter release locking device comprising:
   (A) discriminating means for discriminating whether or not it is necessary to fire the strobe from the state of incident light;
   (B) charging state detecting means for detecting the charging state of the strobe; and
   (C) release locking means for hindering a shutter release when it is determined by said discriminating means that there is need to fire the strobe, and when an incomplete charging state of the strobe is detected by said charging state detecting means.

* * * * *